United States Patent [19]

Hallman

[11] 3,951,212

[45] Apr. 20, 1976

[54] SOD CUTTER

[76] Inventor: Donald E. Hallman, 3333 - 47th Ave. South, Minneapolis, Minn. 55406

[22] Filed: Jan. 30, 1975

[21] Appl. No.: 545,341

[52] U.S. Cl. .................................. 172/19; 47/37
[51] Int. Cl.² .................................. A01B 45/04
[58] Field of Search ............... 172/19, 20, 22, 18; 47/37

[56] References Cited
UNITED STATES PATENTS

| | | | |
|---|---|---|---|
| 1,653,777 | 12/1927 | Miotke | 47/37 X |
| 2,896,729 | 7/1959 | Brechlin | 172/19 |
| 3,332,501 | 7/1967 | Parish | 172/19 |
| 3,534,994 | 10/1970 | Sterk | 172/19 X |

Primary Examiner—George J. Marlo
Attorney, Agent, or Firm—Schroeder Siegfried Ryan & Vidas

[57] ABSTRACT

A sod cutter having an annular body with a tapered, sharpened annular cutting edge, a support sleeve and a shaft journaled in the sleeve and projecting into the annular body. The shaft has a external handle thereon and the shaft is movable relative to the sleeve and the annular body longitudinally and rotatably. The shaft carries a cutting blade thereon to cut the turf in a spiral manner as the shaft is extended into the annular body with the cutting edge of the annular body defining the periphery of the turf plug to be removed and the blade cutting and retaining the plug within the annular body.

8 Claims, 3 Drawing Figures

U.S. Patent   April 20, 1976   3,951,212
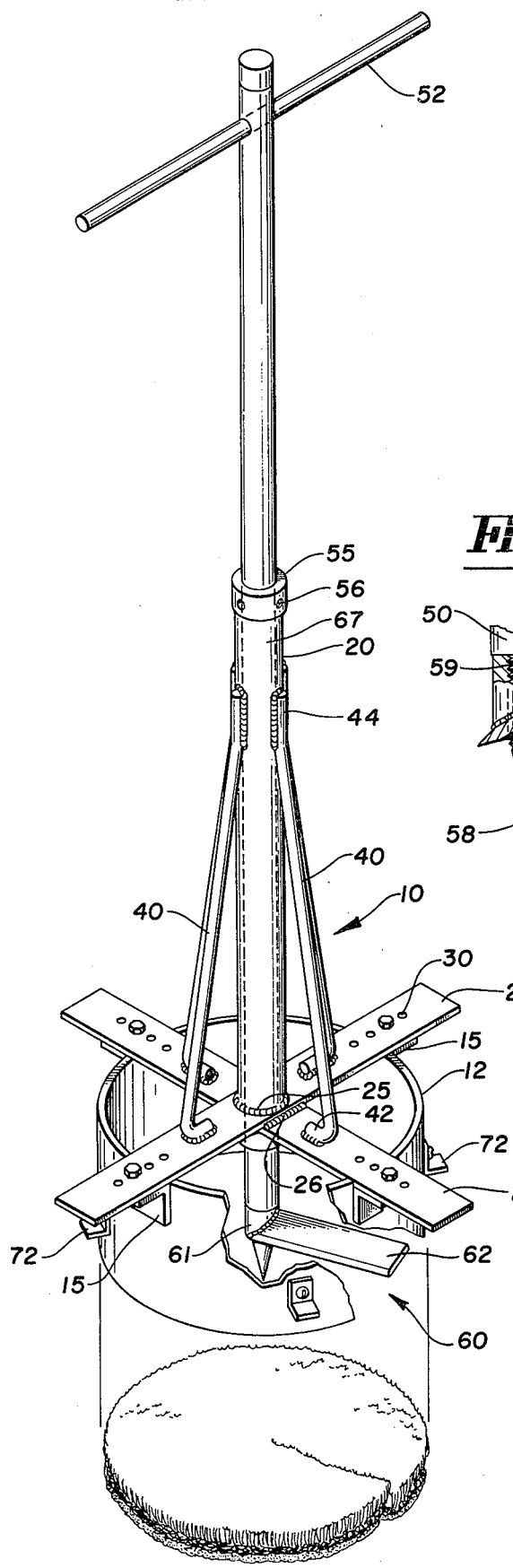
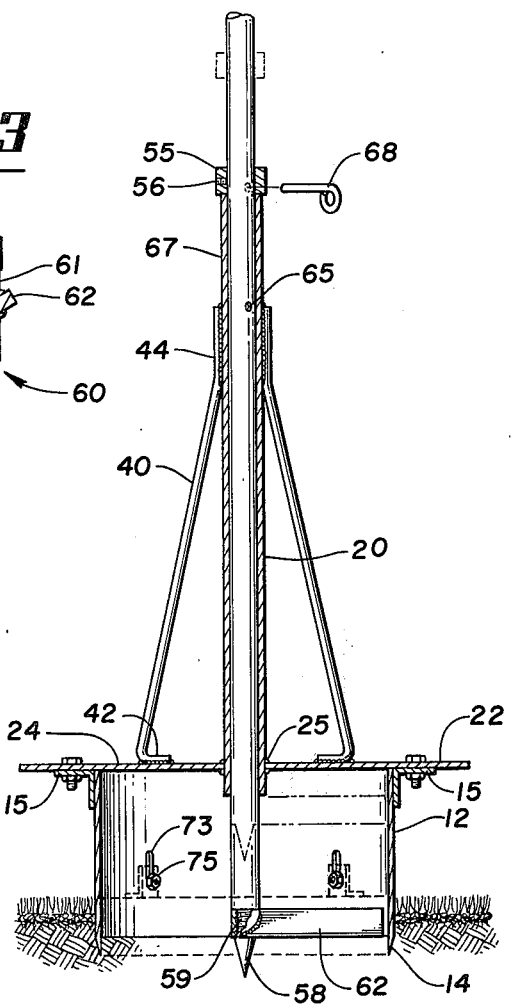

SOD CUTTER

My invention relates to a sod cutter and more particularly to an improved sod cutter adapted to cut a cylindrical turf plug and retain the same through a cutting blade therein.

Turf and sod cutters are known and in use. Most of the prior constructions provide for a cylindrical member to cut and define a sod plug to be removed and replaced. Such structures retain the sod plug after cutting through friction and separate the lower most layer by pulling thereon.

In the present invention, the improved sod cutter is provided in which an annnular plate having a cutting surface thereon which is initially inserted into the turf to cut a plug and define the same with an internally positioned cutting blade mounted on a relative movable shaft thereafter moving through the interior of the plug in a spiral manner to separate the plug from the remaining turf and retain it in the sod cutter as it is removed. The improved construction facilitates ready removal of the plug by reversing the direction of the blade for ease in removal and installation of sod plugs. While such structures are known and used in the replacement of turf on golf fairways and greens, in lawns and in the installation of automatic sprinkling equipment in lawns, the improved sod cutter provides a uniformly and accurately defined plug which may be easily removed and replaced with a similar size plug to facilitate growth and improve appearance.

It is therefore the object of this invention to provide an improved sod cutter.

Another object of this invention is to provide in an improved sod cutter an internally positioned cutting knife adapted to spirally cut through a sod plug and retain the same within the annular cutting member.

A further object of this invention is to provide an improved sod cutter having an annular cutting surface which may be pressed into the sod by foot and a spiral cutting surface operated through a handle to simply and sufficiently remove a uniform sod plug.

A further object of this invention is to provide an improved sod cutter for accuracy in cutting and replacing of turf plugs.

Another object of this invention is to provide an improved sod cutter which may be readily changed for varying sizes of sod plugs.

It is also an object of this invention to provide an improved sod cutter which is easy to use and maintain.

These and other objects of this invention will become apparent from reading of the attached description together with the drawings wherein:

FIG. 1 is a perspective view of the improved sod cutter showing a sod plug displaced therefrom;

FIG. 2 is a sectional view of the sod cutter with parts broken away;

FIG. 3 is a broken elevation view with parts in section showing the internal cutting surface of the sod cutter.

My improved sod cutter is shown generally at 10 in FIGS. 1 and 2. It is adapted to cut a sod plug from turf, such as fairways, greens or lawns for the purpose of replacing spots or areas in the turf with new or healthier sod. It may be also used for removing plugs in the installation of sprinkling equipment in lawns or other similar activities. My particular sod cutter is adapted to be constructed in various sizes, as will be hereinafter identified, to give a variety of size plugs or diameters for varying applications. The structure incorporates an annular metal plate-like cutting member 12, similar to a cylinder open at both extremities, with one peripheral edge of the cutting plate having a knife surface, such as is indicated at 14. Suitable flange members 15 are attached, preferably by welding, at varying points along the opposite peripheral edge of the plate-like member. The flange means are "L" shaped in form and are shown in the drawings as being two pair of diametrically opposed flange members. The outwardly extending portion of the flange members have mounting apertures (not shown) therein for the purpose of mounting a sleeve type guide or mounting member 20 thereon. Two plate-like members positioned perpendicular to one another, as indicated at 22 and 24, are suitably welded together as at 26 and have an aperture in the center where they intersect for the purpose of mounting the sleeve type member or sleeve means, which is preferably welded thereto as at 25. The outer edges of the plate-like members, 22 and 24, have apertures 30 therein which are equidistantly spaced respectively from the center of the sleeve type member to provide for mounting of different diameter plate-like members 12 to vary the size of the sod being cut. The sleeve member or means is stabilized on the members 22 and 24, by means of connecting rods 40 which are bent at one extremity and welded, as at 42, to the members 22, 24, and extend outwardly away from the plate-like member and along the extent of the sleeve member to be secured at the other extremity to the sleeve member through suitable means, such as welding 44, to rigidly support the sleeve member and provide a journaled axis for a shaft 50 to be hereinafter identified. The sleeve member may incorporate suitable internal bushings, as desired. Positioned wiithin the sleeve member 40 is shaft or rod 50 which is located concentric with the sleeve member and spaced concentric with the annular cutting plate member 12. One extremity of the shaft mounts a handle 52 by means of which the shaft 50 may be rotated and positioned, as will be hereinafter noted. Also positioned on the shaft is a collar 55 which is held in position thereon by screws 56 threaded into the collar and bearing against the shaft. The opposite end of the shaft or rod 50 has a conically shaped point 58 with a threaded shoulder 59 positioned adjacent the same. A cutting blade, indicated generally at 60, and incorporating a cylindrical hub 61 with internal threading threads on the threaded surface 59 of the shaft. The hub has a blade 62 welded thereto which extends normal to the axis of the shaft and at an angle approximately 30° to the vertical or the axis of the shaft. The lower-edge of this blade has a knife surface and when the blade is positioned on the shaft and the shaft is free to rotate within the sleeve member, the depression of the handle and the rotation of the shaft will cause the blade to describe a spiral path through sod positioned within the annular plate or cylinder down to a level determined by the engagement of the collar 55 with the end of the sleeve member 20. The shaft or rod 50 is held in elevated position raising the blade 60 and holding the same within the upper confines of the annular plate by means of an aperture 65 positioned in the rod and a suitable pin 68 positioned therethrough and abutting the end of the sleeve member to prevent downward movement of the shaft within the sleeve member. The blade 62 mounted on the hub 61 is of such length as to be disposed slightly spaced from the interior wall of the cylinder or annular cutting plate and the collar is normally positioned thereon so that the rod may be lowered to a position wherein the cutting blade will be adjacent to or at the level of the cutting edge 14 of the annular plate as its lowered position.

Movement of the annular plate into the sod by depressing the same manually is limited by flange members 72 which are L shaped in form and are slidably adjusted in slots 73 positioned in the peripheral surface of the annular cutting plate and held in position therein by nuts and bolts, indicated at 75. Three or four such flange members adjusted to the same relative position will determine a depth of positioning of the annular plate in the cutting of a piece of sod. Once the annular plate is positioned into the turf to define the periphery of the plug to be removed, the pin 68 is removed from the shaft aperture 67 and a rotative and depressive force will be applied to the shaft to advance the cutting blade 60 in a spiral manner through the sod to its lowermost position wherein the collar 55 engages the end of the sleeve member 20. The blade may then be rotated circumferentially a complete turn to insure complete severing of the sod plug and the blade will be positioned below the sod plug so as to hold the same in the sod cutter as the same is withdrawn from the turf.

In the operation of the improved sod cutter, the shaft is raised in the sleeve member and an operator by holding the handle may manipulate the annular plate into the cutting of sod by placing of same into the turf in the initial cutting operation. Normally, the sod cutter will be pressed into the sod by placing the operator's foot on the cross members 24, 22 and guiding the annular cutting surface into the turf to define the periphery of the plug to be removed. The force applied to move the annular plate into the turf may be imparted by the operator's hands through the shaft or rod 55 in the raised position holding the cutting blade 60 out of confines with the sod or turf within the annular cutting plate. Once the cutting plate is moved to a desired depth, the pin 68 is removed from the sleeve member. The operator will then depress and rotate the shaft with the cutting blade 60 thereon allowing the same to be advanced into the sod into a spiral cutting action until the cutting plate member has reached a depth determined by the positioning of the collar 55 on the shaft. At this point, the cutting blade can be given a completed turn, insuring that the lower surface of the plug is completely severed from the remaining turf. The length of the cutting blade is such as to slightly clear the inner peripheral surface of the annular cutting rim and the projecting bolts 75 positioned therein mounting the flange member 72. With the knife in the depressed position, the operator may lift up the sod cutter with the sod therein since the cutting blade is below the surface of the severed sod plug to retain the same in the sod cutter as the same is lifted out of the turf. The plug may then be removed by reversing the rotation of the shaft allowing the blade to follow the spiral path through the sod. A replacement plug may then be obtained from good turf in the same manner and deposited in the hole drilled by the sod cutter in the turf by placing the annular plate in the hole and reversing the movement of the cutting blade, allowing the cutting blade to be withdrawn through the spiral cut in the sod until the same is discharged from the annular rim. When the blade reaches the uppermost position, it will serve as a member to apply force to the sod plug in case friction still retains the same in the annular confines of the cutting blade.

The improved sod cutter is capable of readily interchange of blades for varying sizes of sod plugs connecting different diameter annular cutting plates to the mounting brackets 15 and bolting the same thereon through the bolts and apertures 30. With such a change, a new cutting blade of a comparable radius will be threaded on to the end of the rod 50 to cooperate therewith in the severing operation.

In considering this invention, it should be remembered that the present disclosure is illustrative only and the scope of the invention should be determined by the appended claims.

What I claim is:

1. The sod cutter comprising, an annular plate member having a cutting surface at one edge thereof, the elongated sleeve means mounted on the other edge of the elongated plate member, a shaft positioned through the sleeve means and journaled therein, a handle at one end of said shaft, a cutting blade positioned at the other end of said shaft and extending normal thereto with the blade surface being positioned at an angle to the axis of the shaft, and means for limiting relative movement of the shaft relative to the sleeve means along the axis concentric with the shaft and the sleeve means, said limiting means being included in part in the shaft and in part in the sleeve means, said annular plate being adapted to encircle and sever a peripheral cut of a sod plug upon depression of the plate into the sod and said shaft with the blade thereon being adapted to cut a spiral layer of sod within the annular plate and retain the sod in the annular plate as it is withdrawn.

2. Sod cutter of claim 1 and including flange means mounted on the other edge of said annular member and including means for mounting the sleeve means thereon and providing a surface for depressing the annular member into the sod.

3. The sod cutter of claim 2 and including additional flange means mounted on the external peripheral surface of the annular member and operative to limit movement of the annular member into the sod.

4. The sod cutter of claim 3 in which the additional flange means on the peripheral surface of the annular member are adjustable axially thereon for varying the depth of movement of the annular member into the sod.

5. The sod cutter of claim 1 in which the means for limiting axial movement of the shaft relative to the sleeve means includes a collar member mounted on the shaft and engagable with the sleeve means to limit the axial of movement of the shaft and hence the cutting blade mounted thereon into the sod.

6. The sod cutter of claim 5 in which the means for limiting the movement of the shaft further includes an aperture in the shaft and a pin positioned through the aperture to hold the shaft within the sleeve means in a raised position and hence, the blade with respect to the annular member.

7. The sod cutter of claim 1 in which the cutting blade includes a blade member mounted on a cylindrical hub having an internal threading therein and positioned at the end of the shaft on a threaded extremity thereof.

8. The sod cutter of claim 7 in which the cutting blade bears an angle to the hub and hence the axis of the shaft of approximately 30° and in which the lower most edge of the cutting blade is provided with a knife surface.

* * * * *